(12) United States Patent
Scholes et al.

(10) Patent No.: US 10,022,949 B2
(45) Date of Patent: Jul. 17, 2018

(54) SYSTEM AND METHOD FOR USE IN FABRICATING A STRUCTURE

(71) Applicant: The Boeing Company, Chicago, IL (US)

(72) Inventors: Dallas Steven Scholes, Buckley, WA (US); Richard M. Sutherland, Port Orchard, WA (US); John F. Spalding, Renton, WA (US); Robert J. Keeler, Vashon Island, WA (US)

(73) Assignee: The Boeing Company, Chicago, IL (US)

( * ) Notice: Subject to any disclaimer, the term of this patent is extended or adjusted under 35 U.S.C. 154(b) by 2 days.

(21) Appl. No.: 15/441,322

(22) Filed: Feb. 24, 2017

(65) Prior Publication Data

US 2017/0157912 A1  Jun. 8, 2017

Related U.S. Application Data

(62) Division of application No. 13/795,497, filed on Mar. 12, 2013, now Pat. No. 9,610,761.

(51) Int. Cl.
*B32B 41/00* (2006.01)
*B32B 38/18* (2006.01)

(52) U.S. Cl.
CPC .......... *B32B 41/00* (2013.01); *B32B 38/1841* (2013.01); *B32B 2041/04* (2013.01); *B32B 2309/72* (2013.01)

(58) Field of Classification Search
CPC . B32B 41/00; B32B 38/1841; B32B 2309/72; B32B 2041/04
USPC ................ 156/60, 64, 350, 351, 378, 379
See application file for complete search history.

(56) References Cited

U.S. PATENT DOCUMENTS

| | | | |
|---|---|---|---|
| 5,866,272 A | 2/1999 | Westre et al. | |
| 6,114,050 A | 9/2000 | Westre et al. | |
| 8,309,225 B2 | 11/2012 | Rodgers | |
| 2005/0257880 A1* | 11/2005 | Herring | B42D 25/387 156/230 |
| 2009/0166418 A1 | 7/2009 | Onoda et al. | |
| 2010/0011580 A1 | 1/2010 | Brennan et al. | |
| 2011/0300358 A1 | 12/2011 | Blohowiak et al. | |
| 2012/0177872 A1 | 7/2012 | Tsai et al. | |

* cited by examiner

*Primary Examiner* — Michael N Orlando
*Assistant Examiner* — Joshel Rivera
(74) *Attorney, Agent, or Firm* — Armstrong Teasdale LLP

(57) ABSTRACT

A system for use in fabricating a laminate structure from a plurality of layers of material is provided. The system includes a marker coupled to at least two of the plurality of layers, and a positioning system configured to arrange the plurality of layers in a predetermined layup position based on a position of the markers.

18 Claims, 6 Drawing Sheets

SYSTEM AND METHOD FOR USE IN FABRICATING A STRUCTURE

CROSS-REFERENCE TO RELATED APPLICATIONS

This application is a continuation and claims priority to U.S. patent application Ser. No. 13/795,497 filed Mar. 12, 2013 for "SYSTEM AND METHOD FOR USE IN FABRICATING A STRUCTURE", which is hereby incorporated by reference in its entirety.

BACKGROUND

The field of the present disclosure relates generally to laminate structures and, more specifically, to systems and methods for use in fabricating laminate structures.

The fabrication of multi-layer laminate structures generally uses bonding layers of metallic (e.g., aluminum, titanium, or corrosion resistant steel (CRES)) and/or non-metallic (e.g., carbon fiber, boron, or fiberglass) reinforcement material together with a matrix material to form a rigid structure. The reinforcement material strengthens and stiffens the laminate structure, and the matrix material supports the reinforcement material after the curing process. Multi-layer laminate structures generally have a high strength-to-weight ratio and may be formed in a variety of shapes and sizes.

Forming multi-layer laminate structures generally includes positioning a first layer of reinforcement material in a layup position, applying a matrix material to the first layer, positioning a second layer of reinforcement material in a layup position over the first layer, and repeating this process until the laminate structure includes a desired number of reinforcement layers. As such, forming multi-layer laminate structures is a complex process that includes several intermediate steps that are typically performed by a single technician. Accordingly, it may be common for errors to occur during the layup process that may be undetectable to a technician until post-fabrication, non-destructive inspection of the laminate structure. For example, it may be common for foreign objects to become embedded between layers of the laminate structure. In addition, other common errors include failing to identify or correct errors in ply orientation or layup sequence, and/or the presence of surface defects in the ply layers. Further, when forming laminate structures from non-metallic reinforcement material such as carbon fiber cloth, the material may have a limited usable lifetime. Accordingly, fabricating multi-layer laminate structures may be an expensive and time-consuming process.

BRIEF DESCRIPTION

In one aspect, a system for use in fabricating a laminate structure from a plurality of layers of material is provided. The system includes a marker coupled to at least two of the plurality of layers, and a positioning system configured to arrange the plurality of layers in a predetermined layup position based on a position of the markers.

In another aspect, a method for fabricating a structure is provided. The method includes coupling a marker to at least two layers of a plurality of layers, and arranging the plurality of layers in a predetermined layup position based on a position of the markers.

In yet another aspect, a method of examining a structure is provided. The method includes coupling a marker to at least two layers of a plurality of layers, coupling the plurality of layers together, and producing an image of the structure with a non-destructive inspection based imaging technique. The markers are fabricated from a radio-contrast agent and the markers are visible in the image.

DETAILED DESCRIPTION

Implementations of the present disclosure relate to a layup system and methods for fabricating multi-layer structures, such as a laminate structure. In some implementations, the layup system includes a marker coupled to some or all of the layers of the multi-layer laminate structure and a scanner used to analyze each marker to determine whether to use each of the plurality of layers to form the laminate structure. The markers contain information that enables a technician to determine whether to use the layer associated with the scanned marker. For example, the markers may contain information such as, but not limited to, layer sequencing, ply and job numbers, the material pedigree of the roll from which the ply layer originated, and an expiration date of the material. As used herein, the term "material pedigree" refers to information regarding the manufacture of the material such as, but not limited to, the date of manufacture, the lot number, the batch number, material dimensions, the material class, the material grade, specifications, constituent elements and temper when metal materials are used, and an assembly or installation job number.

In the exemplary implementations, the scanner is part of a scanning system that also includes a contamination analyzer and a surface analyzer. The scanning system is coupled to a coordinate measuring machine (CMM) arm that extends from a work surface of the layup system. As such, the scanning system described herein enables real-time determinations to be made of contamination on the surfaces of each layer, an acceptable surface roughness and activation of each layer, and the material pedigree and proper positioning of each layer. By enabling such real-time determinations to be made, feedback may be simultaneously provided to a layup technician that indicates "Go-NoGo" decision points when fabricating the laminate structure.

Further, when forming composite laminates from fibrous material, each layer is generally arranged in a predetermined layup position and orientation before being coupled to a previously laid-up layer. For example, some known composite laminates have layers arranged such that the weave or direction of fibers within each layer is in a specific orientation. As such, in the exemplary implementation, the markers may be used to arrange each ply layer into the predetermined layup position when forming the laminate structure. Further, in the exemplary implementation, the markers are fabricated from a radio-contrast agent that facilitates increasing the visibility of the barcodes when examined by X-ray based imaging techniques. As such, the laminate structure may be inspected, post-fabrication, to determine the origin and/or quality of material used therein.

Figure 1:
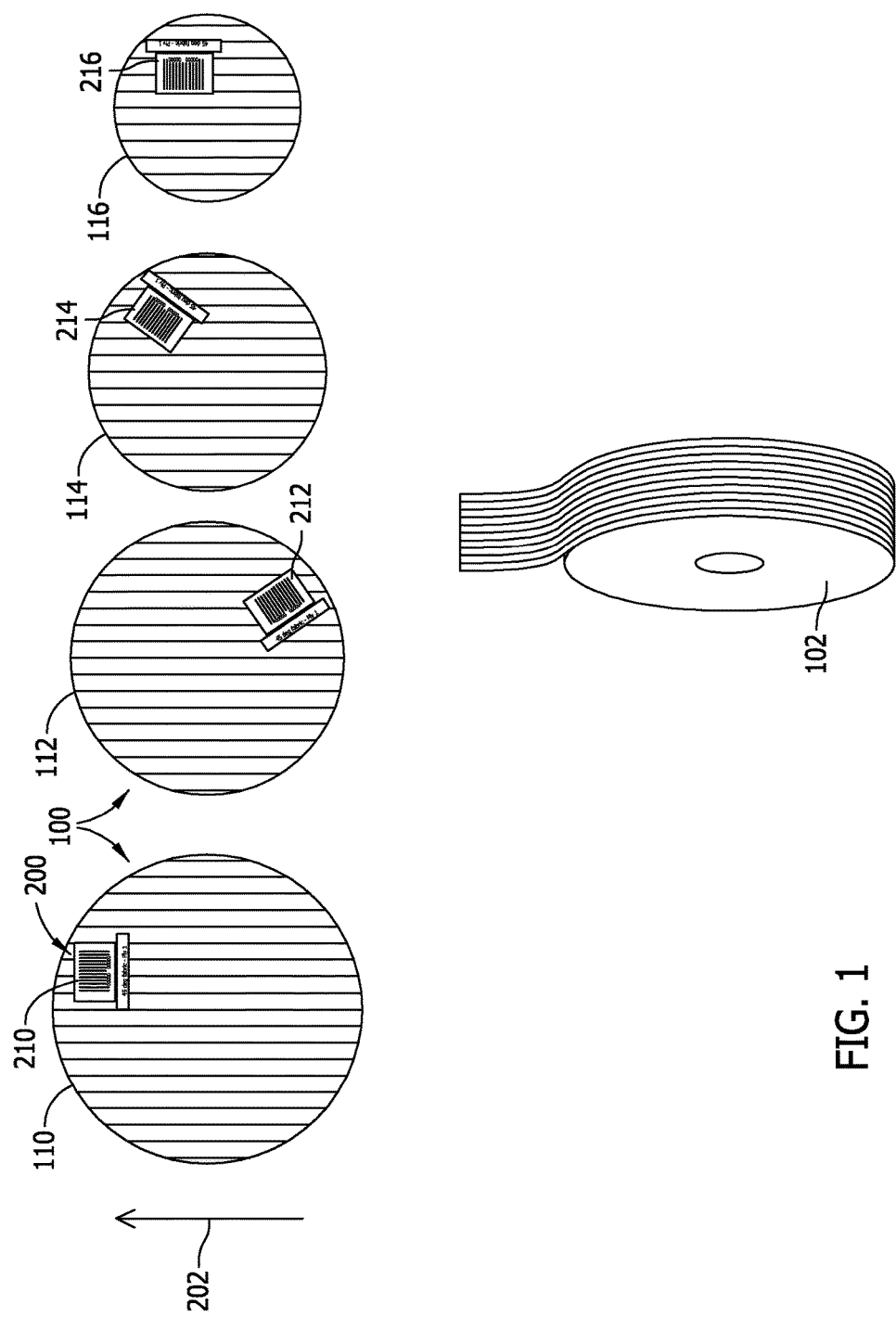
FIG. 1 is a perspective top view of exemplary ply layers cut from an exemplary ply roll.

FIG. 1 is a perspective top view of exemplary ply layers 100 cut from a ply roll 102. In the exemplary implementation, ply layers 100 include a first ply layer 110, a second ply layer 112, a third ply layer 114, and a fourth ply layer 116 cut from ply roll 102. Although four ply layers are shown, it should be understood that any suitable number of ply layers 100 may be used to fabricate a laminate structure 500 (not shown in FIG. 1). In the exemplary implementation, ply layers 100 are fabricated from a unidirectional fibrous material. In alternative implementations, ply layers 100 may be any suitable lamina such as, but not limited to, woven cloth or fibrous material, carbon fiber, boron, fiberglass, or metallic materials.

In the exemplary implementation, as each ply layer 100 is cut from ply roll 102, a marker 200 is coupled to each ply layer 100, and each marker 200 is coupled to ply layers 100 in a position that enables laminate structure 500 to be fabricated with a desired orientation code. For example, factors such as the ply layering sequence of laminate structure 500, the weave direction of fibers in each ply layer 100, and the orientation code of laminate structure 500 are considered when markers 200 are coupled to each ply layer 100. In the exemplary implementation, a first marker 210 is coupled to ply layer 110 at about the 1 O'clock position relative to a weave direction 202, a second marker 212 is coupled to ply layer 112 at about the 4 O'clock position relative to weave direction 202, a third marker 214 is coupled to ply layer 114 at about the 2 O'clock position relative to weave direction 202, and a fourth marker 216 is coupled to ply layer 116 at about the 2 O'clock position relative to weave direction 202. As such, laminate structure 500 will have a [0/−45/+45/90] orientation code. As will be described in further detail, after each marker 200 is coupled to ply layers 100, ply layers 100 are then arranged into a predetermined layup position.

Figure 2:
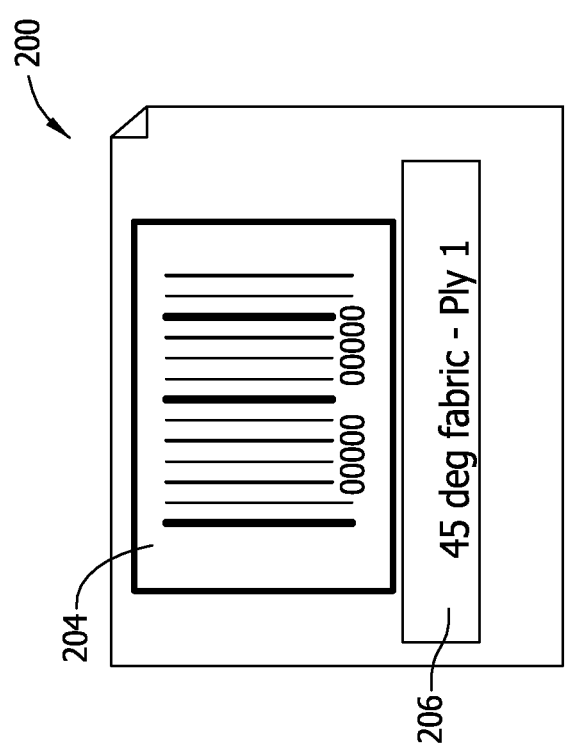
FIG. 2 is an enlarged perspective view of an exemplary barcode that may be used with the ply layers shown in FIG. 1.

FIG. 2 is an enlarged perspective view of marker 200. In the exemplary implementation, marker 200 is fabricated from a radio-contrast agent that facilitates increasing the visibility of marker 200 when examined by X-ray based or other non-destructive imaging techniques. Marker 200 may be fabricated from any suitable radio-contrast agent that enables a layup system 300 (not shown in FIG. 2) to function as described herein. For example, the radio-contrast agent may be reactive or non-reactive with the matrix used to form laminate structure 500 (shown in FIG. 6). Examples of suitable radio-contrast agents include, but are not limited to, barium-based agents and/or iodine-based agents. In one embodiment, marker 200 is fabricated from barium sulfate.

Marker 200 is sized based on the reactivity of the radio-contrast agent used to fabricate marker 200 and/or the maximum defect size allowed by the build specification of laminate structure 500. For example, when marker 200 is fabricated from a non-reactive radio-contrast agent, marker 200 may have any suitable size that enables layup system 300 to function as described herein. When marker 200 is fabricated from a reactive radio-contrast agent, marker 200 is sized such that marker 200 may be classified as a non-rejectable defect. As used herein, the term "non-rejectable defect" refers to a defect within laminate structure 500 that will not cause interlayer delamination of laminate structure 500, or that does not substantially affect the strength of laminate structure 500. Allowable defects may have an area of up to about 3.2 square centimeters for a single discrepancy in a bond line. For example, in one implementation, marker 200 has a width of less than about 0.635 centimeters (cm), a length of less than about 0.635 cm, and a thickness of less than about 0.008 cm.

In the exemplary implementation, marker 200 includes a barcode 204 and a written expression 206. Although shown as a one-dimensional (1D) barcode, it should be understood that barcode 204 may be any suitable information-conveying instrument that enables marker 200 to function as described herein. Examples of suitable instruments include, but are not limited to, 1D barcodes, two-dimensional (2D) barcodes, and Automated Information Technology (AIT) (e.g., embedded chip sets and radio-frequency identification. In the exemplary implementations, barcode 204 contains information that enables a determination to be made on whether use the ply layer associated with each barcode 204. Exemplary information included on barcode 204 includes, but is not limited to, an expiration date of the associated ply layer, job number for the part built, material pedigree of the associated ply layer, orientation code for the ply layer, and ply layer sequencing.

Further, in the exemplary implementation, written expression 206 is positioned away from barcode 204 and conveys information to a technician. Written expression 206 may be written in any suitable language that enables written expression 206 to function as described herein. Exemplary information conveyed by written expression 206 includes, but is not limited to, an associated ply layer number, an orientation angle for the ply layer, an expiration date of the associated ply layer, job number for the part built, material pedigree of the associated ply layer, orientation code for the ply layer, and ply layer sequencing.

Figure 3:
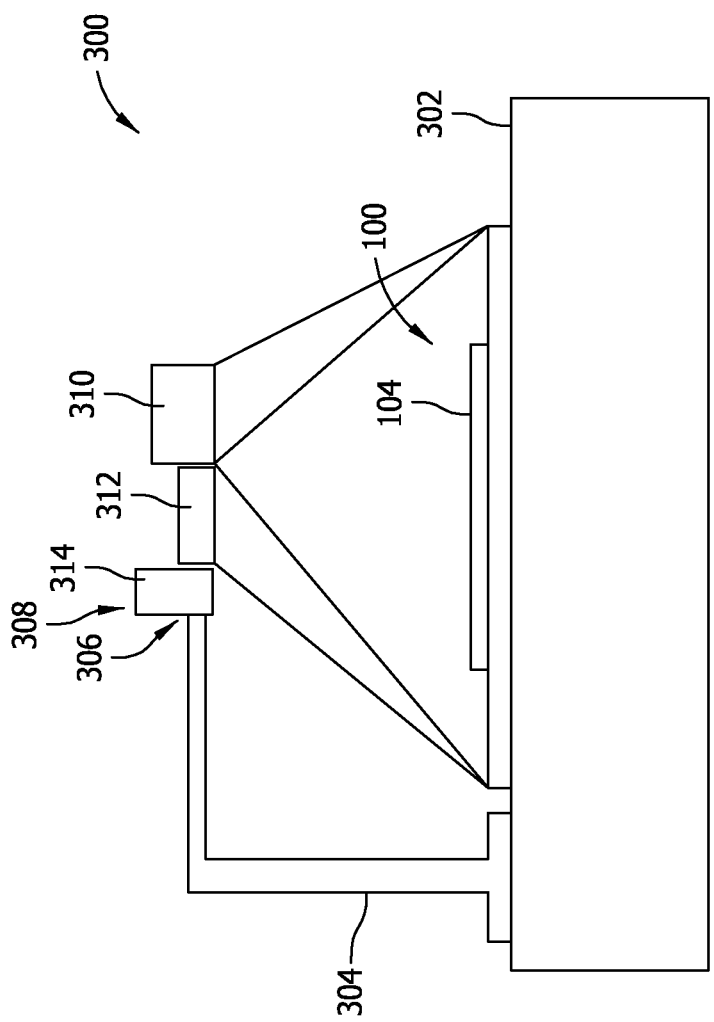
FIG. 3 is a perspective side view of an exemplary layup system that may be used to examine the ply layers shown in FIG. 1.

FIG. 3 is a perspective side view of an exemplary layup system 300. In the exemplary implementation, layup system 300 includes a work surface 302, a coordinate measuring machine (CMM) arm 304 extending from work surface 302, and a scanning system 308 coupled to a free end 306 of CMM arm 304. Scanning system 308 is positioned over work surface 302 and includes a barcode scanner 310, a surface analyzer 312, and a contamination analyzer 314. In the exemplary implementation, ply layers 100 are positioned on work surface 302 to enable scanning system 308 to examine each ply layer 100 prior to applying the next ply layer 100.

In some implementations, scanning system 308 is configured to examine each ply layer 100, determine whether to use each ply layer 100 to fabricate laminate structure 500, and to output an alert signal to a technician when rejection criteria for ply layer 100 has been satisfied. For example, barcode scanner 310 reads barcode 204 (shown in FIG. 2) and analyzes the information contained therein. In one implementation, rejection criteria is satisfied when barcode scanner 310 determines that the ply layer material has expired, which enables an alert to be sent to the layup technician. Surface analyzer 312 detects surface defects in ply layer 100. For example, in some implementations, surface analyzer 312 examines ply layer 100, and rejection criteria may be satisfied when surface analyzer 312 detects a defect larger than the size of a predetermined non-rejectable defect. Contamination analyzer 314 detects the presence of contamination on a surface 104 of ply layer 100. In some implementations, rejection criteria may be met when a substance is detected that is not part of the standard elements (i.e., fiber, resin, and adhesive) normally found in the multi-layer structures described herein and/or a repair.

Figure 4:
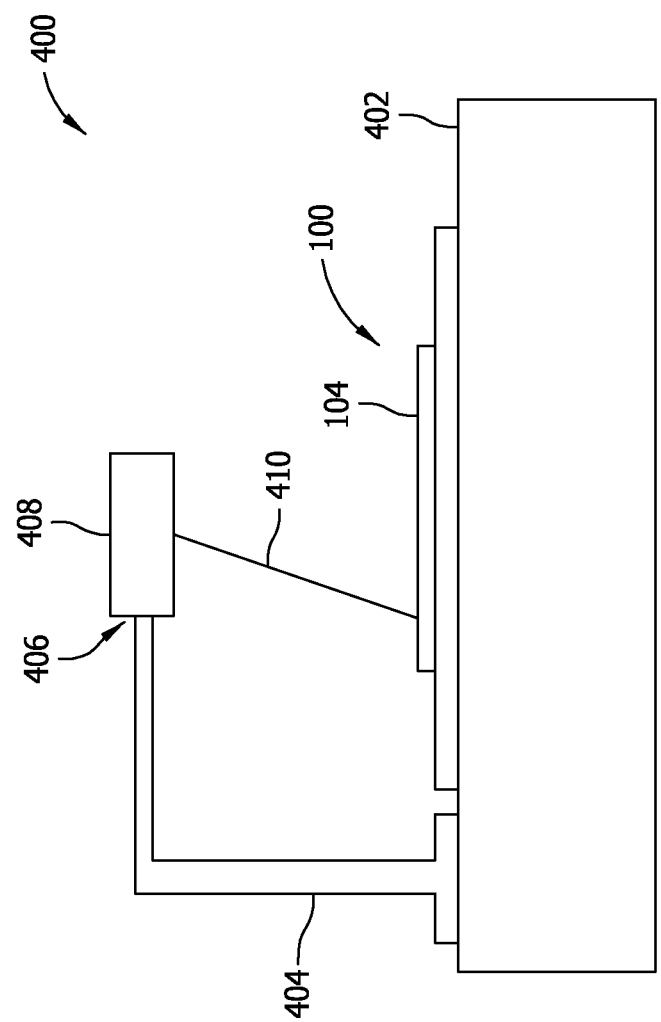
FIG. 4 is a perspective side view of an exemplary positioning system that may be used with the layup system shown in FIG. 3.
Figure 5:
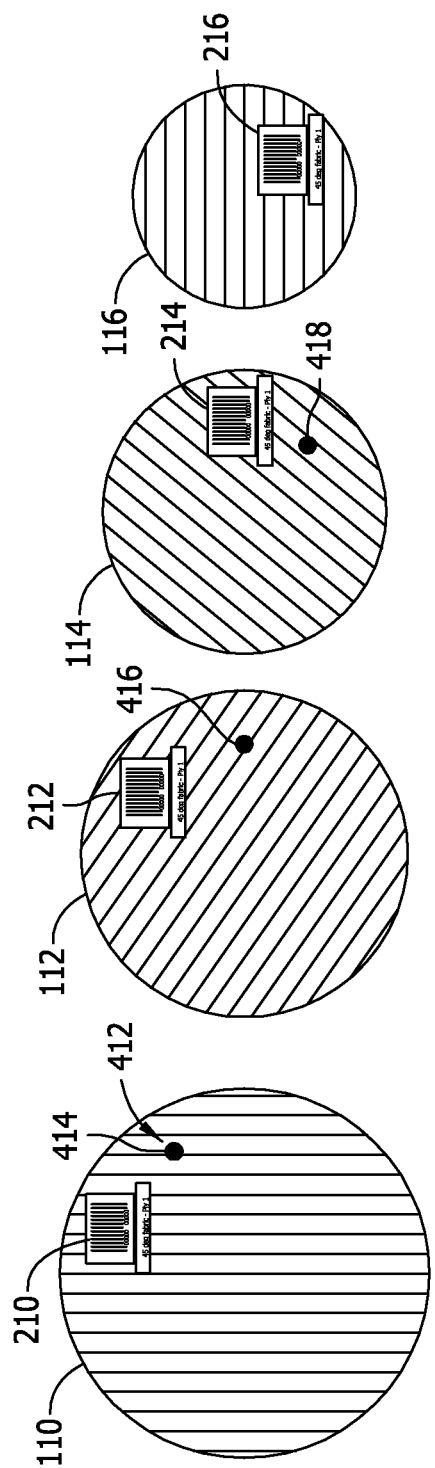
FIG. 5 is a perspective top view of the ply layers shown in FIG. 1 that may be used with the positioning system shown in FIG. 4.

FIG. 4 is a perspective side view of an exemplary positioning system 400 that may be used with layup system 300 (shown in FIG. 3), and FIG. 5 is a perspective top view of ply layers 100 shown in FIG. 1 that may be used with positioning system 400. In some implementations, positioning system 400 may be any suitable system that enables a technician to arrange ply layers 100 into a predetermined layup position. In the exemplary implementation, positioning system includes a work surface 402, a CMM arm 404 extending from work surface 402, and a laser source 408 coupled to a free end 406 of CMM arm 404. After ply layers 100 have been examined by layup system 300, ply layers 100 may be moved to work surface 402 to enable positioning system 400 to arrange each ply layer 100 into a predetermined layup position.

In the exemplary implementation, laser source 408 projects a laser beam 410 from laser source 408 onto at least one of work surface 402 and a surface 104 of one of ply layers 100. As such, a positioning mark 412 that indicates a layup position and orientation for markers 200 is visible to a technician on either work surface 402 or on a surface 104 of an already laid-up ply layer 100. The technician is then able to align each positioning mark 412 with a corresponding marker 200.

Laser source 408 projects laser beam 410 onto work surface 402 and onto ply layer surface 104 in a sequentially different position as ply layers 100 are coupled together. In the exemplary implementation, laser beam 410 locates each positioning mark 412 to a different position as each ply layer 100 is laid-up such that markers 200 do not overlap. In one implementation, laser beam 410 locates each positioning mark 412 such that markers 200 are arranged in a helical configuration and do not overlap when laminate structure 500 is formed. As such, each marker 200 remains visible when laminate structure 500 is examined by X-ray based or other non-destructive inspection imaging techniques. In some implementations, each ply layer 100 is laid up with any suitable degree of tolerance that enables layup system 300 to function as described herein.

In the exemplary implementation, first ply layer 110 has about a 0° orientation, second ply layer 112 has about a −45° orientation, third ply layer 114 has about a +45° orientation, and fourth ply layer 116 has about a 90° orientation. As such, a resulting laminate structure 500 will have a [0/−45/+45/90] orientation code. Further, a first positioning mark 414 is projected onto first ply layer 110, a second positioning mark 416 is projected onto second ply layer 112, and a third positioning mark 418 is projected onto third ply layer 114.

In the exemplary implementation, second marker 212 aligns with first positioning mark 414 when second ply layer 112 is in a predetermined layup position, third marker 214 aligns with second positioning mark 416 when third ply layer 114 is in a predetermined layup position, and fourth marker 216 aligns with third positioning mark 418 when fourth ply layer 116 is in a predetermined layup position. For example, during fabrication of laminate structure 500, second ply layer 112 is positioned on first ply layer 110 and oriented such that first positioning mark 414 projects onto and aligns with second marker 212. Third ply layer 114 is then positioned on second ply layer 112 and oriented such that second positioning mark 416 projects onto and aligns with third marker 214, and fourth ply layer 116 is positioned on third ply layer 114 such that third positioning mark 418 projects onto and aligns with fourth marker 216. Because markers 200 have already been coupled to ply layers 100 in a predetermined position, the technician only needs to align each positioning mark 412 with a corresponding marker 200 when fabricating laminate structure 500. Thus, laminate structure is fabricated in a cost-effective manner.

Figure 6:
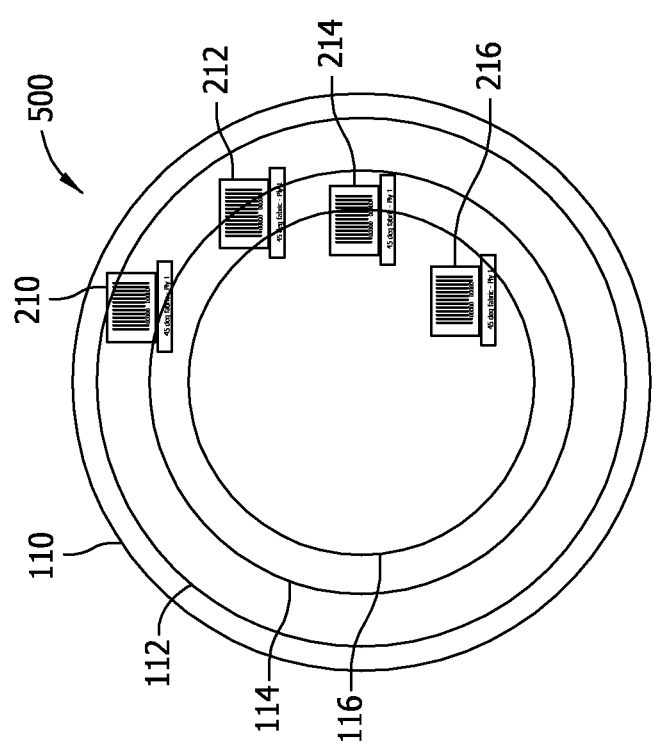
FIG. 6 is a perspective top view of an image of an exemplary laminate structure produced by X-ray based imaging techniques.

FIG. 6 is a perspective top view of an image of an exemplary laminate structure 500 produced by X-ray based or other non-destructive imaging techniques. As described above, markers 200 are fabricated from a radio-contrast agent that facilitates increasing the visibility of markers 200 when laminate structure 500 is examined by X-ray based imaging techniques. For example, in some implementations, first marker 210 is visible through ply layers 112, 114, and 116 and is visible at a resolution that enables barcode 204 to be scanned and written expression 206 (shown in FIG. 2) to be legible. As such, laminate structure 500 may be inspected, post-fabrication, to determine the material pedigree and/or origin of ply layers 100, and associated build information (e.g., the oven cure temperature, vacuum pressures, and the like) used to fabricate laminate structure 500.

The layup system and methods described herein facilitate simplifying the layup process for multi-layer laminate structures by automatically detecting and correcting errors in the layup process in real-time. In the exemplary implementations, the layup system includes a variety of scanners and/or analyzers that are used to detect defects in each ply layer before they are used to form a laminate structure. Further, a marker is coupled to each ply layer and is used to arrange the ply layers in a predetermined layup position, and facilitate determining whether an associated ply layer should be used to form a laminate structure. In some implementations, the marker contains information relating to its associated ply layer, and that information is retrievable by one of the scanners. Further, the markers are fabricated from a radio-contrast agent that facilitates increasing the visibility of the markers when the laminate structure is subjected to non-destructive inspection. As such, the layup system described herein facilitates reducing errors in the fabrication of laminate structures, and enables detailed information about a laminate structure to be obtained post-fabrication.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in fabricating a structure from a plurality of layers of material, said system comprising:
    a first marker coupled to a first layer of the plurality of layers;
    a second marker coupled to a second layer of the plurality of layers; and
    a positioning system configured to arrange the plurality of layers in a predetermined layup position based at least partially on information contained in said first marker and said second marker.

2. The system in accordance with claim 1, wherein said positioning system comprises a laser source that projects a positioning mark onto at least one of a work surface and a surface of one of the plurality of layers, said respective markers configured to align with the positioning mark.

3. The system in accordance with claim 1, wherein at least one of said first marker and said second marker comprises at least one of a barcode and a written expression.

4. The system in accordance with claim 1, wherein at least one of said first marker and said second marker is fabricated from a radio-contrast agent.

5. The system in accordance with claim 1, wherein at least one of said first marker and said second marker is sized to be classified as a non-rejectable defect when the structure is formed.

6. The system in accordance with claim 1 further comprising a scanning system configured to determine whether to use the plurality of layers to form the structure.

7. The system in accordance with claim 6, wherein said scanning system comprises a scanner configured to examine said first and second markers for information contained therein, wherein the information is associated with one of the plurality of layers that said marker is coupled to.

8. The system in accordance with claim 7, wherein said scanner is further configure to read an expiration date of the layer material from at least one of said first marker and said second marker.

9. The system in accordance with claim 6, wherein said scanning system further comprises:
a contamination analyzer configured to detect contamination on a surface of the plurality of layers; and
a surface analyzer configured to detect surface defects on the surface of the plurality of layers.

10. A method of examining a structure, said method comprising:
coupling a marker to at least two layers of a plurality of layers, wherein the marker is fabricated from a radio-contrast agent;
coupling the plurality of layers together; and
producing an image of the structure with a non-destructive inspection based imaging technique, wherein the markers are visible in the image, wherein the non-destructive inspection based imaging technique is an X-ray imaging technique, and wherein the markers are fabricated from a radio-contrast agent.

11. The method in accordance with claim 10, wherein producing an image comprises producing the image at a resolution that enables examination of a barcode associated with the marker.

12. The method in accordance with claim 11 further comprising configuring the barcode to indicate at least one of an expiration date of the layer, a layering sequence of the structure, build information for the structure, and a pedigree of the layer material.

13. A system for use in fabricating a laminate structure, said system comprising:
at least a first marker coupled to at least a first of a plurality of layers in the laminate structure;
at least a second marker coupled to at least a second of the plurality of layers in the laminate structure; and
a positioning system configured to project onto at least one of said plurality of layers to enable said plurality of layers to be arranged in a predetermined layup position based at least partially on information contained in said first and said second markers.

14. A system in accordance with claim 13 wherein at least one of said first marker and said second marker comprises at least of a radio-contrast agent, a barcode, and a written expression.

15. A system in accordance with claim 13 wherein said positioning system comprises a scanning system configured to determine which of said plurality of layers to use when fabricating said laminate structure.

16. A system in accordance with claim 15 wherein said scanning system comprises a scanner configured to examine each of said first marker and said second marker for information contained therein, wherein the information is associated with one of said plurality of layers that said first marker and said second marker is coupled to.

17. A system in accordance with claim 15, wherein said scanning system further comprises a contamination analyzer configured to detect contamination on a surface of said plurality of layers.

18. A system in accordance with claim 15, wherein said scanning system further comprises a surface analyzer configured to detect surface defects on the surface of said plurality of layers.

* * * * *